United States Patent [19]

Poretsky

[11] Patent Number: 4,861,073

[45] Date of Patent: Aug. 29, 1989

[54] NEWSPAPER HOLDER

[76] Inventor: Leonid Poretsky, 101 West 12th St., Apt 14X, New York, N.Y. 10011

[21] Appl. No.: 186,302

[22] Filed: Apr. 26, 1988

[51] Int. Cl.⁴ .......................... B42D 5/00; B42D 9/00; A45C 11/00; B32B 3/04

[52] U.S. Cl. .......................................... 281/45; 281/42; 206/37; 428/124

[58] Field of Search ...................... 281/2, 17, 18, 19 R, 281/34, 35, 42, 45; 282/9 R, 29 R; 412/3, 4, 5; 602/8, 14, 20, 73; 206/37; 24/455, 326; 428/124; 60/352, 342

[56] References Cited

U.S. PATENT DOCUMENTS

| | | | |
|---|---|---|---|
| 512,747 | 1/1894 | Platt | 281/42 |
| 3,409,347 | 11/1968 | Vogel | 206/37 |
| 4,540,612 | 9/1985 | Rhyner | 428/124 |
| 4,618,166 | 10/1986 | Hsi | 281/42 |
| 4,726,606 | 2/1988 | D'Allesandro | 281/42 |

FOREIGN PATENT DOCUMENTS

| | | | |
|---|---|---|---|
| 851491 | 8/1952 | Fed. Rep. of Germany | 281/42 |
| 2215202 | 10/1973 | Fed. Rep. of Germany | 281/42 |
| 2718227 | 11/1978 | Fed. Rep. of Germany | 281/42 |
| 552815 | 5/1923 | France | 281/2 |
| 282397 | 4/1952 | Switzerland | 281/42 |
| 4216 | of 1880 | United Kingdom | 281/42 |

*Primary Examiner*—Frank T. Yost
*Assistant Examiner*—Paul M. Heyrana, Sr.
*Attorney, Agent, or Firm*—Terry M. Gernstein

[57] ABSTRACT

A paper-holding device includes transparent front and back panels that include a plurality of orthogonally oriented intersecting crease lines and a leaf which is mounted to overly the panels. The leaf magnifies material therebeneath, and is adapted, in one embodiment of the invention, to move on the holder. The holder is adapted to be folded in a manner that permits the paper to be folded to expose columns thereof for reading.

9 Claims, 3 Drawing Sheets

NEWSPAPER HOLDER

TECHNICAL FIELD OF THE INVENTION

The present invention relates in general to the field of books, magazines and the like, and relates in particular to holders and covers for such books, magazines and the like.

BACKGROUND OF THE INVENTION

At the present time, it is quite common for a commuter to travel for several hours each way to and from work each day. The commute often is via a form of transportation, such as train, bus or the like, which permits the commuter time to read a newspaper during the commute.

While permitting the commuter the luxury of having time to read, this luxury has its own problems. These problems are associated with the transfer of newsprint from the paper to the commuter's hands and clothing. Another problem for the commuter is associated with the movement of the paper caused by the movement of the vehicle and the other passengers. Such movement makes it difficult to read, and thus reduces the reading efficiency of the commuter.

Still another problem associated with this mode of reading is associated with damage to the paper itself. That is, the paper can become soiled due to liquids, such as coffee, or the like being spilled onto the paper, or due to cigarette ashes being dropped onto the paper.

Still further, many commuters attempt to read a newspaper in crowded conditions, and thus like to fold the paper in a manner that presents various columns for reading. That is, the paper is folded over itself longitudinally and/or transversely into halves and/or fourths. For the sake of convenience, this will be termed "columnar" reading of a paper.

Thus, the problems associated with reading papers under the just-mentioned conditions are several-fold and include problems connected with the damage to the commuter, to the paper itself, and with reading ease and efficiency.

It is here noted that while the present disclosure will refer to a paper, such as a newspaper, this terminology is not intended to be limiting, and can include magazines as well as books and any other type of printed material commonly read during a commute.

While there are several devices on the market which are intended to prevent the transfer of newsprint from the paper to the user's hands, there is no device known to the present inventor which also solves the other problems associated with protection of the paper itself as well as the problem of decreased reading efficiency due to the movement of the paper during the reading process as well as the problems associated with columnar reading. For this reason, none of the present devices has attained the total acceptance of commuters that is necessary for commercial success.

Accordingly, there is need for a device which addresses all of the above-mentioned problems.

OBJECTS OF THE INVENTION

It is a main object of the present invention to provide a holding element which protects both the paper and the user during use while permitting the user to read efficiently under conditions in which the paper may be moving relative to the reader.

It is another object of the present invention to provide a holding element that promotes columnar reading.

It is a specific object of the present invention to magnify the particular portion of the material being read in order to promote reading efficiency.

It is another specific object of the present invention to provide a holding element which is adapted to fold over itself in at least two perpendicular directions.

SUMMARY OF THE INVENTION

These and other objects are accomplished by the paper holding device embodying the present invention which includes transparent front and rear panels that have orthogonally oriented crease lines therein and which includes a leaf means attached to the panels in a manner that permits it to be folded over the panels. The leaf means includes a magnifying means.

The panels can thus be folded over themselves and over each other and the leaf means can be oriented with respect to the panels to magnify the printed material beneath the leaf means.

In this manner, both the paper and the reader can be fully protected by the panels, yet the paper can be folded in a manner that promotes columnar reading, and the magnifying means can be oriented in a manner that overcomes the problems associated with movement of the paper due to jostling or vehicle movement.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
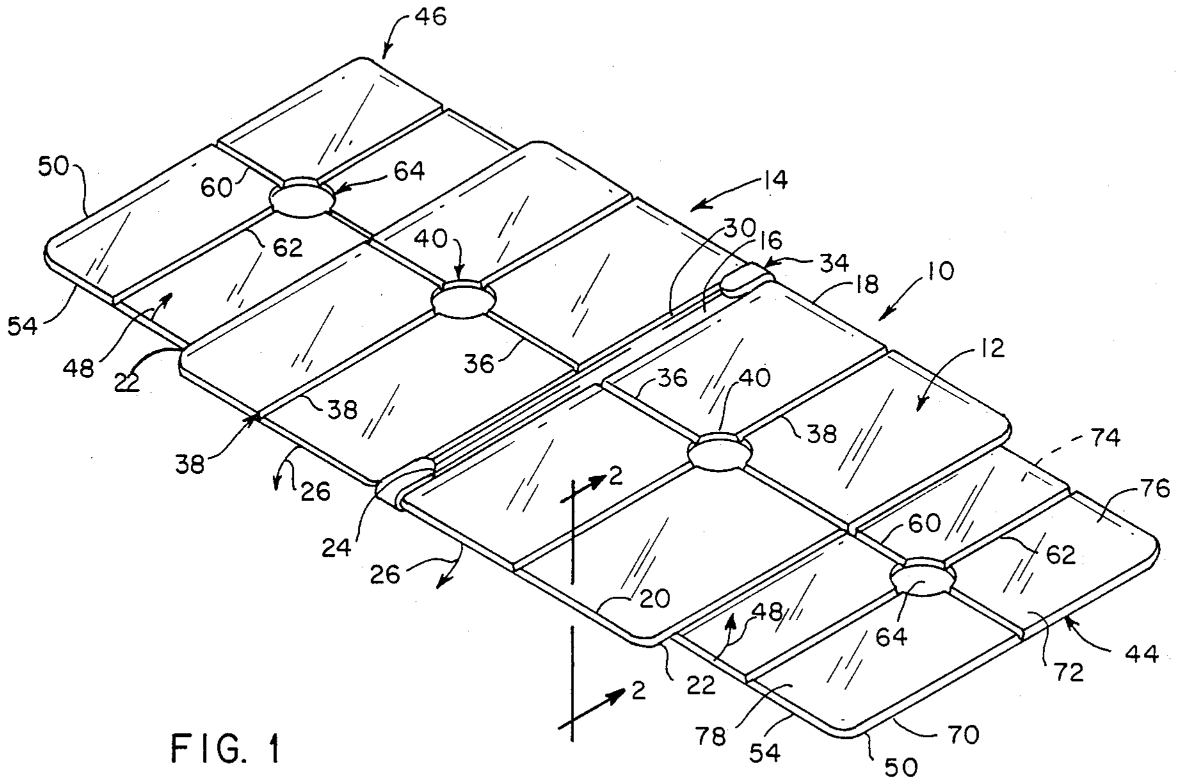
FIG. 1 is a perspective view showing a first form of the paper-holding device embodying the present invention.

Shown in FIG. 1 is a perspective view of a first form of the holding element embodying the present invention. The holding element 10 is monolithic and is formed of transparent, flexible material, such as clear plastic or the like so that the holding element 10 can be used in conjunction with newspapers, or like reading material to cover that material in a manner that promotes reading through the holder and also permits the material to be folded upon itself in halves, fourths or other fractions to expose a selected portion of the material for reading. This will permit a user to, for example, fold a newspaper lengthwise along the columns of the paper, and to also fold the newspaper widthwise across the columns to orient the paper in the most suitable configuration for reading. As mentioned above, this form of reading is referred to in this disclosure as being "columnar" reading.

The holder 10 includes a front panel 12 and a back panel 14 which are foldably connected together by a flexible spine section 16. The front and back panels are flexible and include peripheral side edges 18 and 20 which are spaced apart a distance corresponding to the length of a newspaper along the columnar direction of that paper from the nameplate area to the bottom of the page and peripheral end edges 22 and 24 which are spaced apart a distance corresponding ot the width dimension of the paper as measured from the left ear area of the paper to the other, right, side of the paper. As mentioned above, the reference herein to a newspaper is only for explanation purposes, and the inventor does not intend such reference to be limiting.

As is indicated in FIG. 1, the side edges of the panels are each integrally connected to a corresponding edge of the spine area and are sized to be approximately equal in area to each other whereby a newspaper can be folded about its creaselines which are located adjacent to the spine area 16 of the holder to locate these panels in corresponding locations with the holder interleaved between the folded paper. This folding is indicated in FIG. 1 by arrows 26. The spine area 16 can include a plurality of parallel score lines, such as scoreline 30 to facilitate the folding of the holder 10, and can include a plurality of clips, such as clip 34 for capturing and holding the newspaper to the holder. The clips can be of spring material common to such a clipping function.

Figure 2:
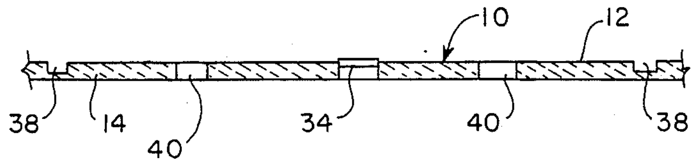
FIG. 2 is a section view taken along line 2—2 of FIG. 1.
Figure 3:
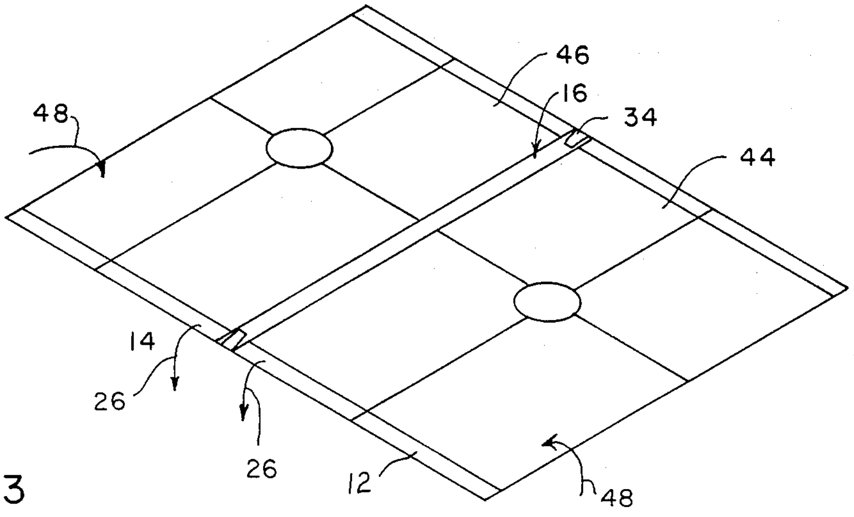
FIG. 3 is a perspective view of the FIG. 1 form of the paper-holding device in a partially folded configuration.
Figure 4:
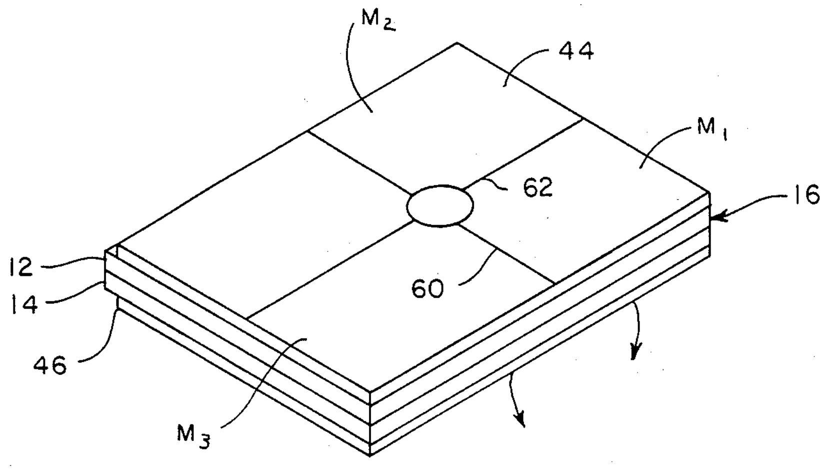
FIG. 4 is a perspective view of the FIG. 1 form of the paper-holding device in a partially folded configuration.
Figure 5:
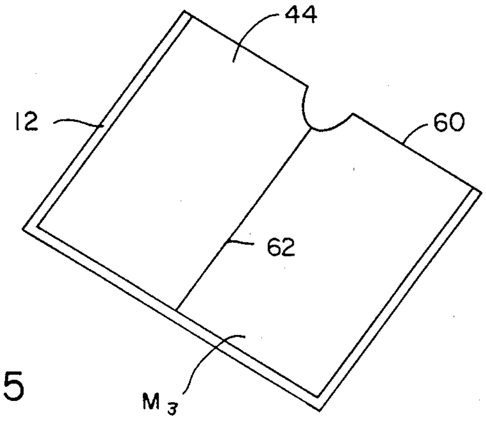
FIG. 5 is a perspective view of the FIG. 1 form of the paper-holding device in a partial columnar configuration.

The panels 12 and 14 ar also formed to facilitate the further folding of the pape mounted on the holder. To this end, each of the panels includes a pair of orthogonally arranged intersecting creaselines, such as widthwise creaseline 36 and lengthwise creaseline 38 shown on front panel 12. These creaselines are also shown in FIG. 2. The creaselines are scored into the body of the panels far enough to permit the panel to be folded about the creaseline with a newspaper held against the panel. The creaselines are also formed to permit the holder and the associated paper to be folded about the creaseline after the holder and the paper have been folded about the other creaseline in order to permit the paper and the holder to be folded a multiplicity of times in various directions.

In order to prevent undesirable gathering of the paper during this just-mentioned folding operation, the holder 10 also includes a plurality of openings, such as opening 40 on the front panel 12. These openings are located at the intersection of the creaselines and provide a space for the paper to move and expand so that the multiple folding of the paper will be facilitated.

Still referring to FIG. 1, it is seen that the holder 10 further includes leaf means 44 and 46 pivotably attached to the outside side edges 22 of the panels 12 and 14 respectively. The foldable connection between each leaf means and the associated panel permits the leaf means to be pivoted in the direction of arrows 48 inwardly toward the spine area 16 to assume an overlying relationship with the associated panel and to capture a newspaper between the leaf means and the associated panel to interleave that paper between the leaf means and the panels.

The leaf means are sized to cover the newspaper from the outer peripheral edge thereof for a substantial portion of the area of that paper. To this end, the leaf means include side edges 50 adapted to lie closely adjacent to the outer side edges of the newspaper, with one of the side edges being attached to the outer side edge 22 of the panel, and end edges 54 located to lie adjacent to the end edges 18 of the panels. The side edges 50 are spaced apart a distance sufficient to permit the leaf means to lie on top of the associated panel with one of the side edges 50 located adjacent to but spaced from the spine area whereby the newspaper can be folded as above discussed. The end edges 54 of the leaf means are spaced apart from each other a distance sufficient to locate those end edges adjacent to but spaced from the corresponding end edge 18 or 20 of the associated panel. In this manner, the leaf means can be folded on top of an associated panel.

The leaf means also is foldable so that a newspaper captured in the holder by such leaf means can be easily folded in the manner discussed above. Thus, each leaf means includes a pair of orthogonally oriented intersecting creaselines 60 and 62 and an opening 64 located at the intersection of these creaselines 60 and 62. The creaselines 60 and 62 and the opening 64 are all located on the leaf means to be positioned in the immediate vicinity of corresponding creaselines 36 and 38 and 40 respectively of the associated panel whereby the leaf means creaselines overly and cooperate with the associated panel creaselines and opening to facilitate the aforediscussed folding of the captured paper.

The capturing and folding operation of the holder 10 is illustrated schematically in FIGS. 1 and 3–6, and attention is now adverted thereto.

The holder 10 is first unfolded into the laid out position shown in FIG. 1, and the newspaper is placed on top of the holder to orient the folding crease of the paper along the spine area and the paper is then clipped to the holder using the clips 34 so that the outer edges of the paper are located adjacent to the outer edges of the holder. The leaf means 44 are folded in the direction of arrows 48 over the captured paper, and the holder panels are folded about the spine in the direction of arrows 26 to fold the holder and the interleaved paper about the spine to expose the paper for reading through the leaf means. The paper and the holder can then be folded along the length of the columns via the creaselines 38 and 62 and/or along the width of the paper via the creaselines 36 and 60 with the openings 40 and 64 preventing the paper from gathering in a manner that prevents such folding operation.

Once interleaved into the holder 10, the paper is fully protected and can be read in columnar fashion while both the paper and the reader are protected. To turn pages of a captured paper, the reader needs only to open up a leaf means by pivoting it away from the captured paper, turn the page, place the leaf means back into position over the next page, turn the page about the spine area, open up the other leaf means, place the turned page between the opened leaf means and the associated panel, and then return the leaf means to its position overlying the captured paper and the associated panel. The clips hold the paper securely on the holder during such page turning operation.

Figure 6:
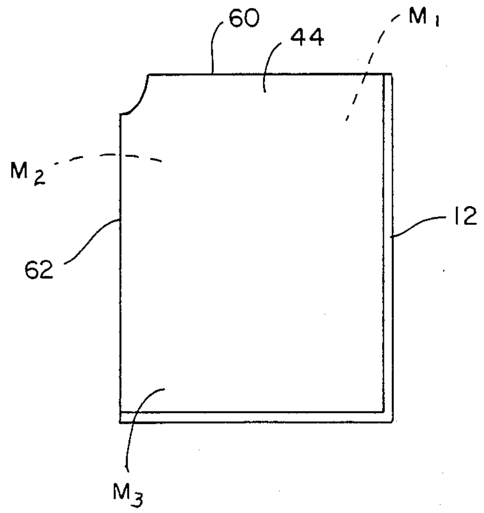
FIG. 6 is a plan view of the FIG. 1 form of the paper-holding device in a fully folded configuration.

To further facilitate efficient reading, the leaf means 44 include means for magnifying the printed material located beneath each leaf means. Such magnifying means can include magnifying panels located within each portion of the leaf means. For example, the leaf means 44 can be formed of double ply material to form an outside layer 70 and an inside layer 72 with a pocket formed therebetween. The pocket is indicated in FIG. 1 by reference numeral 74. Each leaf means can thus include a number of pockets which corresponds to the number of areas formed by the intersecting creaselines. The leaf means is still a monolithic element but is divided by the creaselines. In the form illustrated in FIG. 1, the creaselines divide each leaf means into quadrants, but other divisions can also be used if suitable. Various different forms of magnifiers can also be used in each leaf means to promote reading of small print, viewing pictures and the like. Thus, for example, the pocket in leaf means portion 76 could contain one type of magnifier; whereas, the pocket in the pocket in leaf means portion 78 could contain another form of magnifier. The magnifiers could be interchanged as necessary. The various different magnified areas are indicated in FIG. 6 by reference indicators M1, M2, and M3. It is to be understood, however, that only one magnification needs to be done to fall within the scope of this portion of the disclosure.

Figure 7:
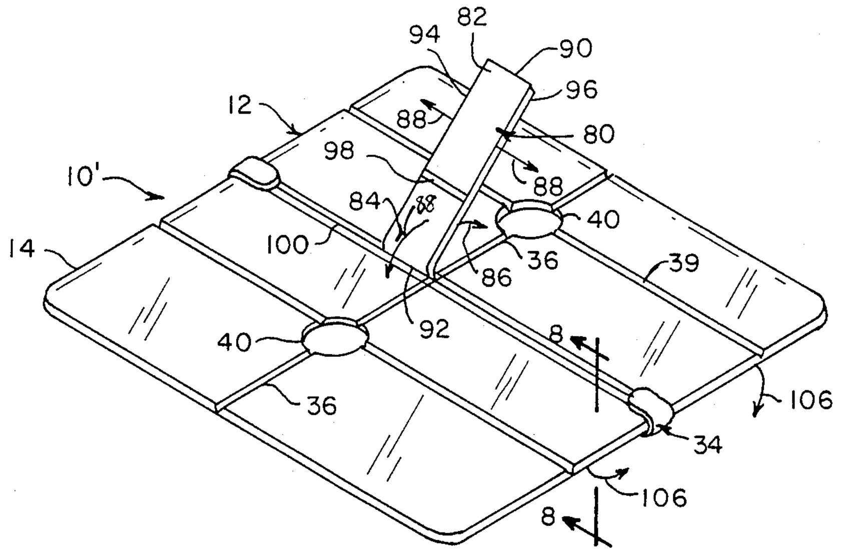
FIG. 7 is a perspective view of another form of the paper-holding device embodying the present invention.
Figure 8:
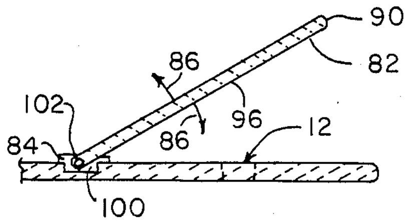
FIG. 8 is a view taken along line 8—8 of FIG. 7.
Figure 9:
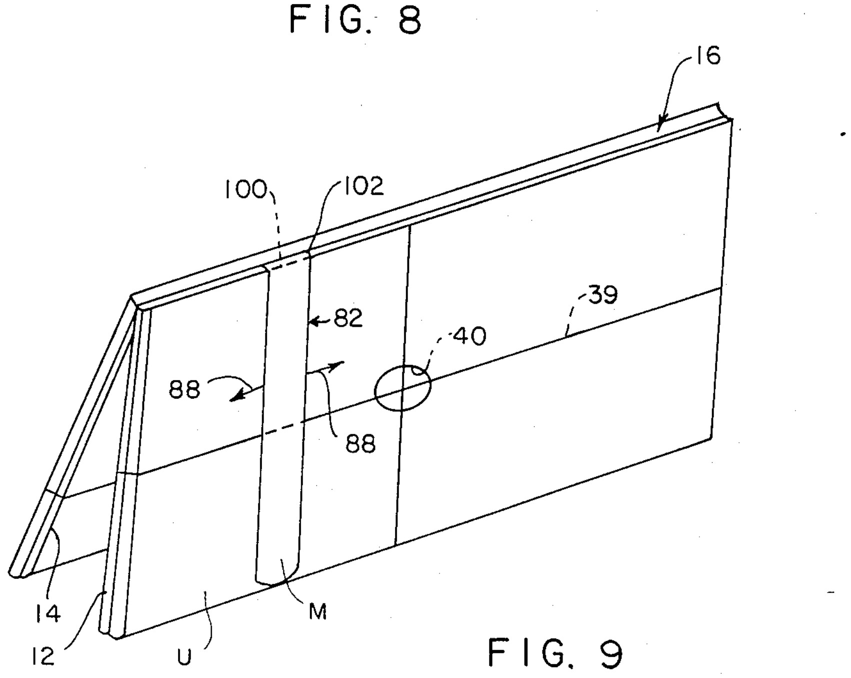
FIG. 9 is a perspective view showing the FIG. 7 form of the paper-holding device in a partially folded configuration.

Other forms of the leaf means can also be used, and one such alternative form is shown in FIGS. 7–9. In such form a holder 10' includes the aforementioned front and back panels which are connected together by a spine which has clips associated therewith. However, in place of the leaf means 44, the holder 10' comprises a leaf means 80 which includes a projecting element 82 pivotally and movably attached to the spine 16 of the holder 10' by a hinge means 84 to be pivotal in the direction of arrows 86 into overlying position with respect to the panels and to be movable along the longitudinal direction of the spine as indicated by arrows 88.

The projecting element 82 includes side edges 90 and 92 and end edges 94 and 96, with the side edge 92 being attached to the hinge means 84. A creaseline 98 is formed in the projecting element to extend in the direction of the spine longitudinal axis, and is located to be positioned over the corresponding longitudinal creaseline 39 on the panels when the element 82 is positioned in overlying fashion with respect to one of the panels whereby the holder 10' can be folded as above discussed in relation to the FIG. 1 form.

The hinge means 84 includes a flexible line 100 attached at each of its ends to a corresponding edge of the holder to extend axially of the holder from the top to the bottom thereof. The line is flexible to be longitudinally extendable so the holder 10' can be folded about the widthwise creaslines 36. In such an instance, the longitudinal extensible nature of the line 100 permits the holder 10' to be so folded.

As shown in FIG. 8, the projecting element 82 is attached to the line 100 by a hinge/pintle type connection with the hinge structure being formed by a reverse fold 102 in the element end 92 which encases the line 100 with the line 100 corresponding to the pintle element of a hinge means. The element 82 thus pivots about the line 100 as indicated by the arrows 86.

As was the case with the leaf means 44, the projecting element 82 can include magnifying means. These magnifying means can include various different magnifiers located in pockets formed in the element 82 as was discussed above whereby various magnifying functions can be performed by the leaf means comprising the projecting element 82.

The use of the holder 10' is similar to the use of the holder 10 with the only exception being the use of the leaf means. Thus, the holder 10' is oriented as shown in FIG. 7 and a newspaper is positioned thereon and clipped thereto using the clips 16 on the foldline of the paper. The panels of the holder 10' are then folded about the spine as indicated by arrows 106. The leaf means element 82 is then pivoted about the hinge means 84 to located that element on top of the paper to thus protect both the paper and the reader while also magnifying the portion of the paper lying beneath the element 82 for promoting efficient reading. The paper in this condition is shown in FIG. 9, and the element 82 can be moved in the direction of arrows 88 to protect the paper and the reader during the reading operation. The magnified indicia is indicated in FIG. 9 by the reference indicator M; whereas the unmagnified material is indicated in FIG. 9 by the reference indicator U.

It is to be understood that while certain forms of the present invention have been illustrated and described herein, it is not to be limited to the specific forms or arrangement of parts described and shown.

I claim:

1. A holding element for releasably holding at least one newspaper-like sheet of paper in a manner which obviates the transfer of print form the sheet to a user while that user holds and/or folds the sheet for reading, comprising:

transparent front and back panels each of which includes an outer edge and an inner edge and a panel width dimension as measured between said outer edge and said inner edge and which is sized and shaped to correspond in size and shape with approximately half of the sheet of paper, said front and back panels each including at least two orthogonally oriented intersecting crease lines for permitting each of said front and back panels to be folded over itself in at least two directions whereby to fold the sheet in a manner that facilitates columnar reading of the sheet through said panels;

a flexible spine connecting said front and back panels together at said panel inner edges in a manner such that said front and back panels can be congruently oriented on top of each other; and leaf means associated with said front and back panels and foldably mounted to fold over a corresponding one of said front and back panels, said leaf means having an outer edge and an inner edge and a width dimension as measured between said leaf means inner edge and said leaf means outer edge which is essentially equal to said panel width dimension and including a crease line located to be congruent with one of said crease lines of said corresponding panel with said leaf means is in overlying relationship with said corresponding panel for permitting said leaf means to be folded over itself when said corresponding panel is folded over itself.

2. The holding element defined in claim 1 wherein said leaf means includes magnifying means for magnifying any printed indicia on the sheet lying beneath said leaf means.

3. The holding element defined in claim 2 wherein said leaf means includes a front leaf foldably attached to said front panel and a rear leaf foldably attached to said back panel.

4. The holding element defined in claim 3 wherein said front leaf and said rear leaf each includes orthogonally oriented crease lines.

5. The holding element defined in claim 2 further including hinge means attaching said leaf means to said spine.

6. The holding element defined in claim 2 further including openings in said front and back panels.

7. The holding element defined in claim 6 wherein said openings are located at the intersections of said orthogonally oriented crease lines.

8. The holding element defined in claim 2 further including clip means on said spine for attaching the sheet to said spine.

9. The holding element defined in claim 5 wherein said leaf means is attached to said hinge means in a manner such that said leaf means is movable on said hinge means along the longitudinal direction of said spine.

* * * * *